United States Patent
Wang et al.

(10) Patent No.: US 12,068,895 B2
(45) Date of Patent: Aug. 20, 2024

(54) DATA TRANSMISSION METHOD AND APPARATUS

(71) Applicant: Huawei Technologies Co., Ltd., Shenzhen (CN)

(72) Inventors: Lei Wang, Shanghai (CN); Lei Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 18/166,529

(22) Filed: Feb. 9, 2023

(65) Prior Publication Data
US 2023/0188392 A1 Jun. 15, 2023

Related U.S. Application Data

(63) Continuation of application No. PCT/CN2021/111617, filed on Aug. 9, 2021.

(30) Foreign Application Priority Data

Aug. 10, 2020 (CN) .......................... 202010798004.4

(51) Int. Cl.
*H04L 27/20* (2006.01)
*H04L 27/22* (2006.01)

(52) U.S. Cl.
CPC .............. *H04L 27/20* (2013.01); *H04L 27/22* (2013.01)

(58) Field of Classification Search
CPC ....... H04L 27/20; H04L 27/22; H04L 1/0041; H04L 1/0045; H04L 1/0057; H04L 27/2071; H04W 4/70
See application file for complete search history.

(56) References Cited

U.S. PATENT DOCUMENTS

| 6,140,947 A | 10/2000 | Livingston |
| 2005/0265469 A1* | 12/2005 | Aldana ................. H04L 1/0071 |
| | | 375/260 |
| 2019/0149381 A1* | 5/2019 | Vos ....................... H04L 5/0053 |
| | | 370/329 |

FOREIGN PATENT DOCUMENTS

| CN | 108365848 A | 8/2018 |
| CN | 108462554 A | 8/2018 |
| CN | 111447160 A | 7/2020 |
| WO | 2018234851 A1 | 12/2018 |

* cited by examiner

*Primary Examiner* — David S Huang
(74) *Attorney, Agent, or Firm* — Slater Matsil, LLP

(57) ABSTRACT

Embodiments of this application provide a data transmission method and apparatus. A method at a transmit end includes: obtaining a first sequence, where the first sequence includes a first sub-sequence and a second sub-sequence; mapping the first sub-sequence into K third sub-sequences based on a preset sequence group; performing differential coding and phase modulation on the second sub-sequence to obtain a fourth sequence whose length is K'; obtaining K fifth sub-sequences based on the K third sub-sequences and the K' fourth sub-sequences; and outputting a second sequence including the K fifth sub-sequences. A method at a receive end includes: obtaining a second sequence including K fifth sub-sequences, and detecting the K fifth sub-sequences based on a preset sequence group to obtain a first sub-sequence; and performing differential demodulation based on the first sub-sequence to obtain a second sub-sequence, so that a first sequence is determined.

20 Claims, 8 Drawing Sheets

DATA TRANSMISSION METHOD AND APPARATUS

CROSS-REFERENCE TO RELATED APPLICATIONS

This application is a continuation of International Application No. PCT/CN2021/111617, filed on Aug. 9, 2021, which claims priority to Chinese Patent Application No. 202010798004.4, filed on Aug. 10, 2020. The disclosures of the aforementioned applications are hereby incorporated by reference in their entireties.

TECHNICAL FIELD

This application relates to the field of communication technologies, and in particular, to a data transmission method and apparatus.

BACKGROUND

A new radio (NR) technology covers three application scenarios: enhanced mobile broadband (eMBB), massive machine type communication (mMTC), and ultra-reliable and low latency communication (URLLC). The mMTC is characterized by support for massive machine type communication. In an mMTC scenario, there are a large quantity of potential to-be-accessed users in a cell, and these users may be terminal devices in various forms. In this scenario, the users send relatively small data packets each time. However, because there are a quite large quantity of users, a quite serious challenge is posed to network access performance and data transmission performance.

SUMMARY

Embodiments of this application provide a data transmission method and apparatus, to transmit more information bits on a same time-frequency resource, thereby improving data transmission performance.

According to a first aspect, this application provides a data transmission method, including: obtaining a first sequence; determining a first sub-sequence and a second sub-sequence based on the first sequence, where a length of the second sub-sequence is m*K'; mapping the first sub-sequence into K third sub-sequences based on a preset sequence group, where K is an integer greater than or equal to 2, and K' is a positive integer less than K; performing differential coding and modulation on the second sub-sequence to obtain a fourth sub-sequence whose length is K', where a modulation order used for the modulation is 2^m; obtaining K fifth sub-sequences based on the K third sub-sequences and the fourth sub-sequence whose length is K'; and outputting a second sequence, where the second sequence includes the K fifth sub-sequences.

In the data transmission method provided in the first aspect of this application, to-be-sent data is divided into two parts, a first part is mapped into a plurality of short sequences (the K third sub-sequences), differential coding and modulation are performed on a second part to obtain a complex sequence (the fourth sequence whose length is K'), and then the to-be-output sequence is obtained based on the plurality of short sequences and the sequence obtained through the differential coding and modulation, so that when a same resource is consumed, additional bits can be transmitted in addition to data of the first part.

In a possible implementation, the second sub-sequence is a part of the first sub-sequence; or the second sub-sequence is the same as the first sub-sequence. In this implementation, some or all bits of the first sub-sequence are repeatedly transmitted, so that transmission reliability of the first sub-sequence can be improved.

When differential coding and modulation are performed on the second sub-sequence to obtain the fourth sub-sequence whose length is K', differential coding may be performed before modulation, or modulation may be performed before differential coding.

In a possible implementation, the second sub-sequence is modulated to obtain a sixth sub-sequence whose length is K'; and differential coding is performed on the sixth sub-sequence whose length is K' to obtain the fourth sub-sequence whose length is K'.

The performing differential coding on the sixth sub-sequence $b_1, b_2, \ldots, b_{K'}$ whose length is K' to obtain the fourth sub-sequence $c_1, c_2, \ldots, c_{K'}$ whose length is K' may be specifically: $c_1=b_1$; and when K' is greater than or equal to 2, $c_k=b_k*c_{k-1}$, where $k=2, \ldots,$ or K'.

In a possible implementation, differential coding is performed on the second sub-sequence to obtain a sixth sub-sequence whose length is m*K'; and the sixth sub-sequence whose length is m*K' is modulated to obtain the fourth sub-sequence whose length is K'.

The performing differential coding on the second sub-sequence $a_1, a_2, \ldots, a_{K'}$ to obtain a sixth sub-sequence $b_1, b_2, \ldots, b_{m*K'}$ whose length is m*K' may be specifically: $b_1=a_1$; and when m*K' is greater than or equal to 2, $b_k=a_k$ XOR $b_{k-1}$, where $k=2, \ldots,$ or K', and XOR indicates a binary exclusive OR operation.

In a possible implementation, the modulating the second sub-sequence or modulating the sixth sub-sequence includes: performing modulation through M-ary phase shift keying M-PSK. $m=\log_2 M$, and M is an integer power of 2. Possibly, the modulation order M may be 2, in other words, binary phase shift keying BPSK is performed on the second sub-sequence or the sixth sub-sequence. In this case, m=1, and K' bits can be additionally transmitted. Alternatively, the modulation order M may be 4, in other words, quadrature phase shift keying QPSK is performed on the second sub-sequence or the sixth sub-sequence. In this case, m=2, and 2K' bits can be additionally transmitted. Alternatively, the modulation order M may be 8, in other words, 8 phase shift keying 8PSK is performed on the second sub-sequence or the sixth sub-sequence. In this case, m=3, and 3K' bits can be additionally transmitted.

In a possible implementation, the obtaining K fifth sub-sequences $z_k$ based on the K third sub-sequences $x_1$ and the fourth sub-sequence $c_k$ whose length is K', including multiplying the third sub-sequence $x_1$ and the fourth sub-sequence $c_k$ to obtain the fifth sub-sequence $z_k$, may be specifically:

$z_1=x_1$, where $k=1, \ldots,$ or K−K'; and $z_k=c_{k-1}*x_k$, where $k=K-K'+1, \ldots,$ or K.

It should be noted that at least one of the K fifth sub-sequences is the same as at least one third sub-sequence, in other words, at least one third sub-sequence is not multiplied by the fourth sub-sequence, so that a receive end successfully restores the first sub-sequence and the second sub-sequence after receiving the second sequence including the K fifth sub-sequences.

In a possible implementation, the mapping the first sub-sequence into K third sub-sequences based on a preset sequence group includes:

obtaining K seventh sub-sequences based on the first sub-sequence; and mapping each seventh sub-sequence into each third sub-sequence based on a value of each seventh sub-sequence and the preset sequence group. Each third sub-sequence is a sequence in the preset sequence group, and a sequence number of each third sub-sequence in the preset sequence group is equal to a value of a corresponding seventh sub-sequence.

The preset sequence group may also be referred to as a preset codebook. The preset sequence group is specified in a protocol or is a sequence group agreed on in advance by the receive end and a transmit end. For example, a network device delivers the sequence group by using signaling.

Possibly, K preset sequence groups respectively correspond to the K seventh sub-sequences. A sequence is selected, from a preset sequence group corresponding to the seventh sub-sequence, as a corresponding third sub-sequence based on a value of the seventh sub-sequence.

Possibly, there is a common sequence group, and a sequence subgroup corresponding to each seventh sub-sequence is selected from the common sequence group. Then a sequence is selected, from a corresponding sequence subgroup, as a corresponding third sub-sequence based on the value of each seventh sub-sequence.

In a possible implementation, the method further includes: dividing the first sub-sequence into K eighth sub-sequences; and adding check bits to the K eighth sub-sequences to obtain the K seventh sub-sequences. Some or all of the K seventh sub-sequences include check bits.

A check bit obtaining manner is agreed on in advance by the receive end and the transmit end, for example, specified in a protocol, or the transmit end notifies the receive end of a check manner. A check bit calculation manner is not limited in this application. For example, the $k^{th}$ check bit may be generated through encoding based on one or more preceding eighth sub-sequences.

According to a second aspect, this application provides a data transmission method, including: obtaining a second sequence, where the second sequence includes K fifth sub-sequences; detecting the K fifth sub-sequences based on a preset sequence group to obtain a first sub-sequence; performing differential demodulation based on the obtained first sub-sequence to obtain a second sub-sequence; and then determining a first sequence based on the first sub-sequence and the second sub-sequence.

According to the data transmission method provided in the second aspect, after receiving the second sequence, a receive end can obtain the first sub-sequence through detection, and then obtain the second sub-sequence through differential demodulation, so that when the second sub-sequence is additionally transmitted in addition to the first sub-sequence, data actually to be transmitted by a transmit end is restored.

In a possible implementation, the detecting the K fifth sub-sequences based on a preset sequence group to obtain a first sub-sequence includes: the first sub-sequence includes K seventh sub-sequences; detecting each fifth sub-sequence based on the preset sequence group, and determining a sequence that is in the preset sequence group and that corresponds to each fifth sub-sequence, where a sequence number of the corresponding sequence is a value of each seventh sub-sequence; and determining each seventh sub-sequence based on the value of each seventh sub-sequence.

Possibly, the detecting the K fifth sub-sequences based on a preset sequence group to obtain a first sub-sequence may be performing correlation detection based on the preset sequence group. A sequence number of a sequence that is in the preset sequence group and that has a highest correlation with the fifth sub-sequence is used as a value of the seventh sub-sequence included in the first sub-sequence.

A length of each seventh sub-sequence is known to the receive end and the transmit end. A value of each bit of the seventh sub-sequence is determined based on a length and a value of the seventh sub-sequence, so that the seventh sub-sequence is determined.

In a possible implementation, to-be-sent data includes K eighth sub-sequences, and the K seventh sub-sequences are obtained by adding check bits to some or all of the K eighth sub-sequences, in other words, some or all of the K seventh sub-sequences include check bits. In this implementation, after the seventh sub-sequence is determined through detection based on the preset sequence group, verification is performed based on a check manner agreed on by the receive end and the transmit end, and the K eighth sub-sequences are restored after the verification succeeds, so that the first sub-sequence sent by the transmit end is obtained.

In a possible implementation, the performing differential demodulation based on the first sub-sequence includes: determining a phase difference between the fifth sub-sequence and the seventh sub-sequence; and performing differential demodulation based on the phase difference to obtain the second sub-sequence.

In a possible implementation, a phase difference $H_k$ between the $k^{th}$ fifth sub-sequence and the $k^{th}$ seventh sub-sequence is determined; a phase difference $H_{k-1}$ between the $(k-1)^{th}$ fifth sub-sequence and the $(k-1)^{th}$ seventh sub-sequence is determined; and differential demodulation is performed on $H_k$ and $H_{k-1}$ to obtain $a_{k-(K-K')}$ in the second sub-sequence, where $k=K-K'-1, \ldots,$ or K, K is an integer greater than or equal to 2, and K' is a positive integer less than K.

For example, when $K'=K-1$, differential demodulation is performed $H_k$ and $H_{k-1}$ to obtain $a_{k-1}$, where $k=2, \ldots,$ or K. In this implementation, the second sub-sequence $a_1, \ldots, a_{K'}$ can be restored.

According to a third aspect, this application provides a communication apparatus. The communication apparatus is a transmit end apparatus that may be configured to perform the method according to the first aspect, and the communication apparatus may be a terminal device or a network device, may be an apparatus (for example, a chip, a chip system, or a circuit) in the terminal device or the network device, or may be an apparatus that can be used together with the terminal device or the network device. In a possible implementation, the communication apparatus may include modules or units correspondingly performing the methods/operations/steps/actions described in the first aspect. The module or the unit may be a hardware circuit, may be software, or may be implemented in a combination of a hardware circuit and software. In a possible implementation, the communication apparatus may include a processing unit and a transceiver unit. The processing unit may be configured to invoke the transceiver unit to perform receiving and/or sending functions. For example, the processing unit is configured to: obtain a first sequence; determine a first sub-sequence and a second sub-sequence based on the first sequence, where a length of the second sub-sequence is m*K'; map the first sub-sequence into K third sub-sequences based on a preset sequence group, where K is an integer greater than or equal to 2, and K' is a positive integer less than K; perform differential coding and modulation on the second sub-sequence to obtain a fourth sub-sequence whose length is K', where a modulation order used for the modulation is 2^m; and obtain K fifth sub-sequences based on the K third sub-sequences and the fourth sub-sequence whose length is K'; and the transceiver unit is configured to output a second sequence, where the second sequence includes the K fifth sub-sequences.

In a possible implementation, the second sub-sequence is a part of the first sub-sequence; or the second sub-sequence is the same as the first sub-sequence.

In a possible implementation, the processor is specifically configured to: modulate the second sub-sequence to obtain a sixth sub-sequence whose length is K'; and perform differential coding on the sixth sub-sequence whose length is K' to obtain the fourth sub-sequence whose length is K'.

In a possible implementation, the processor is specifically configured to perform, by using the following formulas, differential coding on the sixth sub-sequence $b_1, b_2, \ldots, b_{K'}$ whose length is K' to obtain the fourth sub-sequence $c_1, c_2, \ldots, c_{K'}$ whose length is K':

$c_1 = b_1$; and when K' is greater than or equal to 2, $c_k = b_k * c_{k-1}$, where k=2, ..., or K'.

In a possible implementation, the processor is specifically configured to: perform differential coding on the second sub-sequence to obtain a sixth sub-sequence whose length is m*K'; and modulate the sixth sub-sequence whose length is m*K' to obtain the fourth sub-sequence whose length is K'.

In a possible implementation, the processor is specifically configured to perform, by using the following formulas, differential coding on the second sub-sequence $a_1, a_2, \ldots, a_{K'}$ to obtain a sixth sub-sequence $b_1, b_2, \ldots, b_{m*K'}$ whose length is m*K':

$b_1 = a_1$; and when m*K' is greater than or equal to 2, $b_k = a_k$ XOR $b_{k-1}$, where k=2, ..., or K', and XOR indicates a binary exclusive OR operation.

In a possible implementation, the modulating the second sub-sequence or modulating the sixth sub-sequence includes: the processor is specifically configured to perform modulation through M-ary phase shift keying M-PSK. m=log 2M, and M is an integer power of 2. Possibly, the modulation order M may be 2, in other words, binary phase shift keying BPSK is performed on the second sub-sequence or the sixth sub-sequence. In this case, m=1, and K' bits can be additionally transmitted. Alternatively, the modulation order M may be 4, in other words, quadrature phase shift keying QPSK is performed on the second sub-sequence or the sixth sub-sequence. In this case, m=2, and 2K' bits can be additionally transmitted. Alternatively, the modulation order M may be 8, in other words, 8 phase shift keying 8PSK is performed on the second sub-sequence or the sixth sub-sequence. In this case, m=3, and 3K' bits can be additionally transmitted.

In a possible implementation, the processor is specifically configured to obtain, by using the following formulas, the K fifth sub-sequences $z_k$ based on the K third sub-sequences $x_1$ and the fourth sub-sequence $c_k$ whose length is K':

$z1 = x1$, where k=1, ..., or K-K'; and $zk = ck-1 * xk$, where k=K-K'+1, ..., or K.

In a possible implementation, the mapping the first sub-sequence into K third sub-sequences based on a preset sequence group includes:

the processor is specifically configured to: obtain K seventh sub-sequences based on the first sub-sequence; and map each seventh sub-sequence into each third sub-sequence based on a value of each seventh sub-sequence and the preset sequence group. Each third sub-sequence is a sequence in the preset sequence group, and a sequence number of each third sub-sequence in the preset sequence group is equal to the value of each seventh sub-sequence.

In a possible implementation, the processor is further configured to: divide the first sub-sequence into K eighth sub-sequences; and add check bits to the K eighth sub-sequences to obtain the K seventh sub-sequences.

It should be noted that for beneficial effects of the implementations of the communication apparatus provided in the third aspect of embodiments of this application, refer to the beneficial effects of the data transmission method according to the first aspect. Details are not described herein again.

According to a fourth aspect, this application provides a communication apparatus. The communication apparatus is a receive end apparatus that may be configured to perform the method according to the first aspect, and the communication apparatus may be a terminal device or a network device, may be an apparatus (for example, a chip, a chip system, or a circuit) in the terminal device or the network device, or may be an apparatus that can be used together with the terminal device or the network device. In a possible implementation, the communication apparatus may include modules or units correspondingly performing the methods/operations/steps/actions described in the first aspect. The module or the unit may be a hardware circuit, may be software, or may be implemented in a combination of a hardware circuit and software. In a possible implementation, the communication apparatus may include a processing unit and a transceiver unit. The processing unit may be configured to invoke the transceiver unit to perform receiving and/or sending functions. For example, the transceiver unit is configured to obtain a second sequence, where the second sequence includes K fifth sub-sequences; and the processing unit is configured to: detect the K fifth sub-sequences based on a preset sequence group to obtain a first sub-sequence; perform differential demodulation based on the first sub-sequence to obtain a second sub-sequence; and determine a first sequence based on the first sub-sequence and the second sub-sequence.

In a possible implementation, the detecting the K fifth sub-sequences based on a preset sequence group to obtain a first sub-sequence includes: the first sub-sequence includes K seventh sub-sequences; the processor is specifically configured to: detect each fifth sub-sequence based on the preset sequence group, and determine a sub-sequence that is in the preset sequence group and that corresponds to each fifth sub-sequence, where a sequence number of the corresponding sub-sequence is a value of each seventh sub-sequence; and determine each seventh sub-sequence based on the value of each seventh sub-sequence.

Possibly, the detecting the K fifth sub-sequences based on a preset sequence group to obtain a first sub-sequence may be: the processor is specifically configured to perform correlation detection based on the preset sequence group. A sequence number of a sequence that is in the preset sequence group and that has a highest correlation with the fifth sub-sequence is used as a value of the seventh sub-sequence included in the first sub-sequence.

In a possible implementation, the performing differential demodulation based on the first sub-sequence includes: the processing unit is specifically configured to: determine a phase difference between the fifth sub-sequence and the seventh sub-sequence; and perform differential demodulation based on the determined phase difference to obtain the second sub-sequence.

Specifically, in a possible implementation, the processing unit is further configured to: determine a phase difference $H_k$ between the $k^{th}$ fifth sub-sequence and the $k^{th}$ seventh sub-sequence; determine a phase difference $H_{k-1}$ between the $(k-1)^{th}$ fifth sub-sequence and the $(k-1)^{th}$ seventh sub-sequence; and perform differential demodulation on $H_k$ and $H_{k-1}$ to obtain $a_{k-(K-K')}$ in the second sub-sequence, where $k=K-K'+1, \ldots,$ or $K$, $K$ is an integer greater than or equal to 2, and $K'$ is a positive integer less than $K$.

It should be noted that for beneficial effects of the implementations of the communication apparatus provided in the fourth aspect of embodiments of this application, refer to the beneficial effects of the data transmission method according to the first aspect. Details are not described herein again.

According to a fifth aspect, an embodiment of this application further provides a communication apparatus, including a processor, configured to execute a computer program or executable instructions stored in a memory. When the computer program or the executable instructions are executed, the apparatus is enabled to perform the method according to the first aspect and the possible implementations of the first aspect.

In a possible implementation, the processor and the memory are integrated together.

In another possible implementation, the memory is located outside the communication apparatus.

The communication apparatus further includes a communication interface, and the communication interface is used by the communication apparatus to communicate with another device, for example, send or receive data and/or a signal. For example, the communication interface may be a transceiver, a circuit, a bus, a module, or another type of communication interface.

According to a sixth aspect, an embodiment of this application further provides a communication apparatus, including a processor, configured to execute a computer program or executable instructions stored in a memory. When the computer program or the executable instructions are executed, the apparatus is enabled to perform the method according to the second aspect and the possible implementations of the second aspect.

In a possible implementation, the processor and the memory are integrated together.

In another possible implementation, the memory is located outside the communication apparatus.

The communication apparatus further includes a communication interface, and the communication interface is used by the communication apparatus to communicate with another device, for example, send or receive data and/or a signal. For example, the communication interface may be a transceiver, a circuit, a bus, a module, or another type of communication interface.

According to a seventh aspect, an embodiment of this application further provides a communication apparatus, including an input/output interface and a logic circuit. The input/output interface is configured to input or output a signal or data. The input/output interface is specifically configured to obtain a first sequence. The input/output interface is further configured to output a second sequence. The second sequence includes K fifth sub-sequences. The logic circuit is configured to perform the method according to any one of the first aspect and the possible implementations of the first aspect to determine the second sequence based on the first sequence.

According to an eighth aspect, an embodiment of this application further provides a communication apparatus, including an input/output interface and a logic circuit. The input/output interface is configured to obtain a second sequence. The second sequence includes K fifth sub-sequences. The logic circuit is configured to perform the method according to any one of the second aspect and the possible implementations of the second aspect to determine a first sequence.

According to a ninth aspect, an embodiment of this application further provides a computer-readable storage medium. The computer-readable storage medium stores a computer program, and the computer program is executed by a processor, so that some or all steps of the methods according to any one of the first aspect and the possible implementations of the second aspect and any one of the second aspect and the possible implementations of the second aspect are performed.

According to a tenth aspect, an embodiment of this application further provides a computer program product including executable instructions. When the computer program product runs on user equipment, some or all steps of the methods according to any one of the first aspect and the possible implementations of the first aspect and any one of the second aspect and the possible implementations of the second aspect are performed.

According to an eleventh aspect, an embodiment of this application further provides a chip system. The chip system includes a processor, and may further include a memory. The chip system is configured to implement the methods according to any one of the first aspect and the possible implementations of the second aspect and any one of the second aspect and the possible implementations of the second aspect. The chip system may include a chip, or include a chip and another discrete device.

According to a twelfth aspect, an embodiment of this application further provides a communication system. The communication system may include a transmit end device and a receive end device. The transmit end device may be a terminal or a network device, and the receive end device may be a terminal or a network device. The communication system may be configured to implement operations performed according to the first aspect, the implementations of the first aspect, the second aspect, and the implementations of the second aspect.

BRIEF DESCRIPTION OF THE DRAWINGS

The following describes some accompanying drawings in embodiments of this application.

DETAILED DESCRIPTION OF ILLUSTRATIVE EMBODIMENTS

Figure 1:
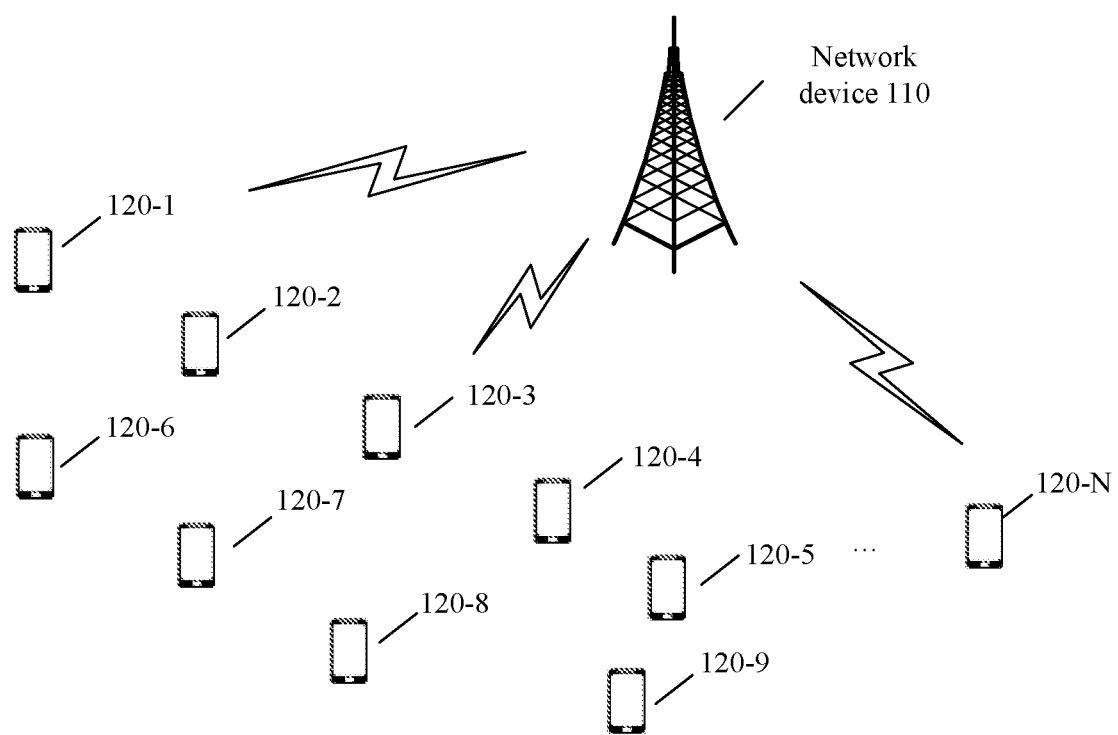
FIG. 1 is a schematic diagram of a communication system according to an embodiment of this application.

Embodiments of this application provide a data transmission method and apparatus, to improve data transmission accuracy in a scenario in which there are a large quantity of users and small packets are transmitted.

It should be noted that, the term "and/or" in this specification describes only an association relationship for describing associated objects and represents that three relationships may exist. For example, A and/or B may represent the following three cases: Only A exists, both A and B exist, and only B exists. In the specification and claims in embodiments of this application, the terms "first", "second", and the like are intended to distinguish between different objects but do not indicate a particular order of the objects. For example, a first sequence and a second sequence are used to distinguish between different sequences, and are not used to describe a specific sequence of target objects. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner. In the description of embodiments of this application, unless otherwise stated, "a plurality of" means two or more than two. For example, a plurality of processing units mean two or more processing units, and a plurality of systems mean two or more systems. In embodiments of this application, "agreed on by a receive end and a transmit end" may be "specified in a protocol", may be "negotiated by the receive end and the transmit end by using signaling", or may be "configured by the receive end or the transmit end". This is not limited in this application.

The following briefly describes related concepts in embodiments of this application.

mMTC is one of three typical services supported by 5G. Typical mMTC services include power distribution automation of a smart grid, a smart city, and the like. Main characteristics are as follows: There are a large quantity of networking devices, an amount of transmitted data is relatively small, and data is insensitive to a transmission delay.

An MTC device is a terminal device that supports the mMTC service. The MTC device may be a wireless device or may be a wired device. The wireless device may be a device with a wireless receiving/sending function, and may be deployed on land and include an indoor or outdoor device, a handheld device, or a vehicle-mounted device, or may be deployed on the water (for example, a ship), or may be deployed in the air (for example, an airplane, a balloon, or a satellite). The MTC device may be a mobile phone, a tablet computer (Pad), a computer with the wireless receiving/sending function, user equipment (UE), an access terminal, a subscriber unit, a user station, a mobile station, a mobile console, a handheld device with a wireless communication function, a computing device or another processing device connected to a wireless modem, a vehicle-mounted device or a wearable device, a virtual reality (VR) terminal device, an augmented reality (AR) terminal device, a wireless device in industrial control, a wireless device in self driving, a wireless device in telemedicine (remote medical), a wireless device in a smart grid, a wireless device in transportation safety, a wireless device in a smart city, a wireless device in a smart home, or the like. This is not limited herein.

The technical solutions provided in this application may be applied to a plurality of communication systems, for example, a 4th generation (4G) communication system such as a long term evolution (LTE) system, a worldwide interoperability for microwave access (WiMAX) communication system, or a wireless fidelity (Wi-Fi) system, a 5th generation (5G) communication system such as a new radio (NR) system, and a future mobile communication system.

FIG. 1 shows an example of a communication system applicable to embodiments of this application. As shown in FIG. 1, the network architecture includes a network device 110 and terminal devices (120-1, 120-2, . . . , 120-N, and the like), and a base station 10 is connected to each terminal device by using a wireless network.

The terminal device 120 may be any one of the foregoing MTC devices, and details are not described herein again.

The network device 110 may be an evolved NodeB (eNB or eNodeB) in LTE, a base station in a 5G network or a future evolved public land mobile network (PLMN), a broadband network gateway (BNG), an aggregation switch, a 3rd generation partnership project (3GPP) access device, or the like. Optionally, the network device in this embodiment of this application may include various forms of base stations, for example, a macro base station, a micro base station (also referred to as a small cell), a relay station, an access point, a 5G base station, a future device that implements a base station function, a transmitting and receiving point (TRP), a transmitting point (TP), a mobile switching center, or devices that undertake a base station function in device-to-device (D2D), vehicle-to-everything (V2X), and machine-to-machine (M2M) communication. This is not specifically limited in this embodiment of this application.

The network device 110 may interact with another network device (not shown), and may further communicate and interact with a core network device, to provide a communication service for the terminal device. For example, the core network device is a device in a 5G core network (CN). As an interface from a bearer network to a data network, the core network provides a communication connection, authentication, management, policy control, data service bearer completion, and the like for user equipment (UE).

In an mMTC scenario, there are a large quantity of potential to-be-accessed users in a cell, and the user may be any one of the foregoing terminal devices. These users send relatively small data packets each time. However, because there are a quite large quantity of users, a quite serious challenge is posed to network access performance and data transmission performance.

For the mMTC scenario, currently, an unsourced transmission solution is mainly discussed, a plurality of users transmit data by using a same codebook, and identifiers of the users are not carried. It is considered that this solution can support large-scale access in the mMTC scenario. For example, information bits sent by the user are first divided into blocks, and a check bit is added after each information bit block, to form a plurality of encoded sub-blocks. Then a sequence is selected, based on a binary value of the encoded sub-block, from a preset sequence group (codebook) for sending.

In the foregoing solution, a quantity of information bits that can be transmitted is affected by a quantity of sequences in the sequence group. To transmit more information bits, a size of the sequence group needs to exponentially increase. A larger sequence group indicates a higher correlation between sequences in the group and a corresponding decrease in detection performance of a receive end.

To transmit more information bits without affecting detection performance of the receive end, embodiments of this application provide a data transmission method and apparatus.

The following describes embodiments of this application with reference to accompanying drawings in embodiments of this application.

Figure 2:
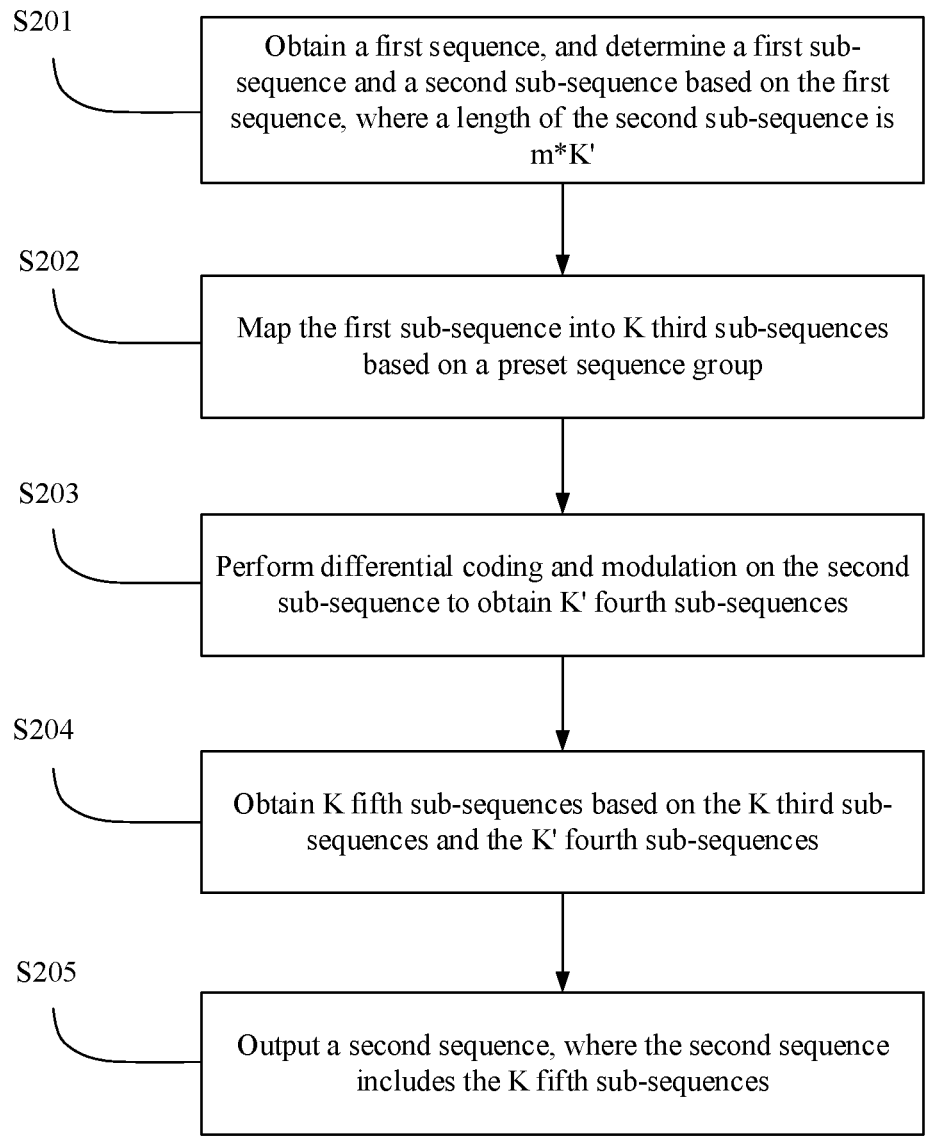
FIG. 2 is a schematic flowchart of a data transmission method at a transmit end according to an embodiment of this application.

FIG. 2 is a schematic flowchart of data transmission at a transmit end according to an embodiment of this application. It should be noted that the transmit end refers to a side on which data is sent, and the method may be performed by a terminal device or a network device.

S201: Obtain a first sequence, and determine a first sub-sequence and a second sub-sequence based on the first sequence, where a length of the first sub-sequence is B, and a length of the second sub-sequence is $m*K'$.

In a possible implementation, the first sub-sequence and the second sub-sequence are different sequences. In this implementation, most information bits, to be specific, $B+m*K'$ bits, can be transmitted.

In another possible implementation, the first sub-sequence and the second sub-sequence may have overlapping pails. For example, the second sub-sequence is a part of the first sub-sequence, or the second sub-sequence and the first sub-sequence are a same sequence, or the second sub-sequence includes a part of the first sub-sequence and another information bit. In this implementation, some or all bits of the first sub-sequence are repeatedly transmitted, so that transmission reliability of the first sub-sequence can be improved.

S202: Map the first sub-sequence into K third sub-sequences based on a preset sequence group.

The preset sequence group may also be referred to as a preset codebook. The preset sequence group is specified in a protocol or is a sequence group agreed on in advance by a receive end and the transmit end. For example, when the transmit end is a terminal device, the preset sequence group may be a sequence group delivered by a network device. How to obtain the preset sequence group is not limited in this application.

It should be noted that a sequence group such as the "preset sequence group", a "common sequence group", or a "sequence subgroup" in this application includes sequentially arranged sequences. Assuming that the sequence group includes N sequences, sequence numbers of the sequences in the sequence group are successively 0 to N−1. Possibly, the sequence group may be in a matrix form of M rows and N columns, and in this case, the sequence group includes N sequences, and a length of each sequence is M. Possibly, in the sequence group, lengths of sequences may be different. Possibly, the sequence group may be in a form of a sequence set, and in this case, sequences in the sequence set have unique and different sequence numbers or indexes. Assuming that there are N sequences in the sequence set, a value range of the sequence number or the index is 0 to N−1.

It should be noted that a length of the first sub-sequence that can be transmitted depends on a quantity of sequences in the sequence group.

In a possible implementation, K seventh sub-sequences are obtained based on the first sub-sequence; and each seventh sub-sequence is mapped into each corresponding third sub-sequence based on a value of each of the K obtained seventh sub-sequences and the preset sequence group. Each third sub-sequence is a sequence in the preset sequence group. For example, a sequence number of each third sub-sequence in the preset sequence group is equal to the value of each seventh sub-sequence.

Possibly, some or all of the K seventh sub-sequences include check bits. For example, the K seventh sub-sequences are obtained by dividing the first sub-sequence into K eighth sub-sequences and adding check bits to some or all of the K eighth sub-sequences.

Figure 5:
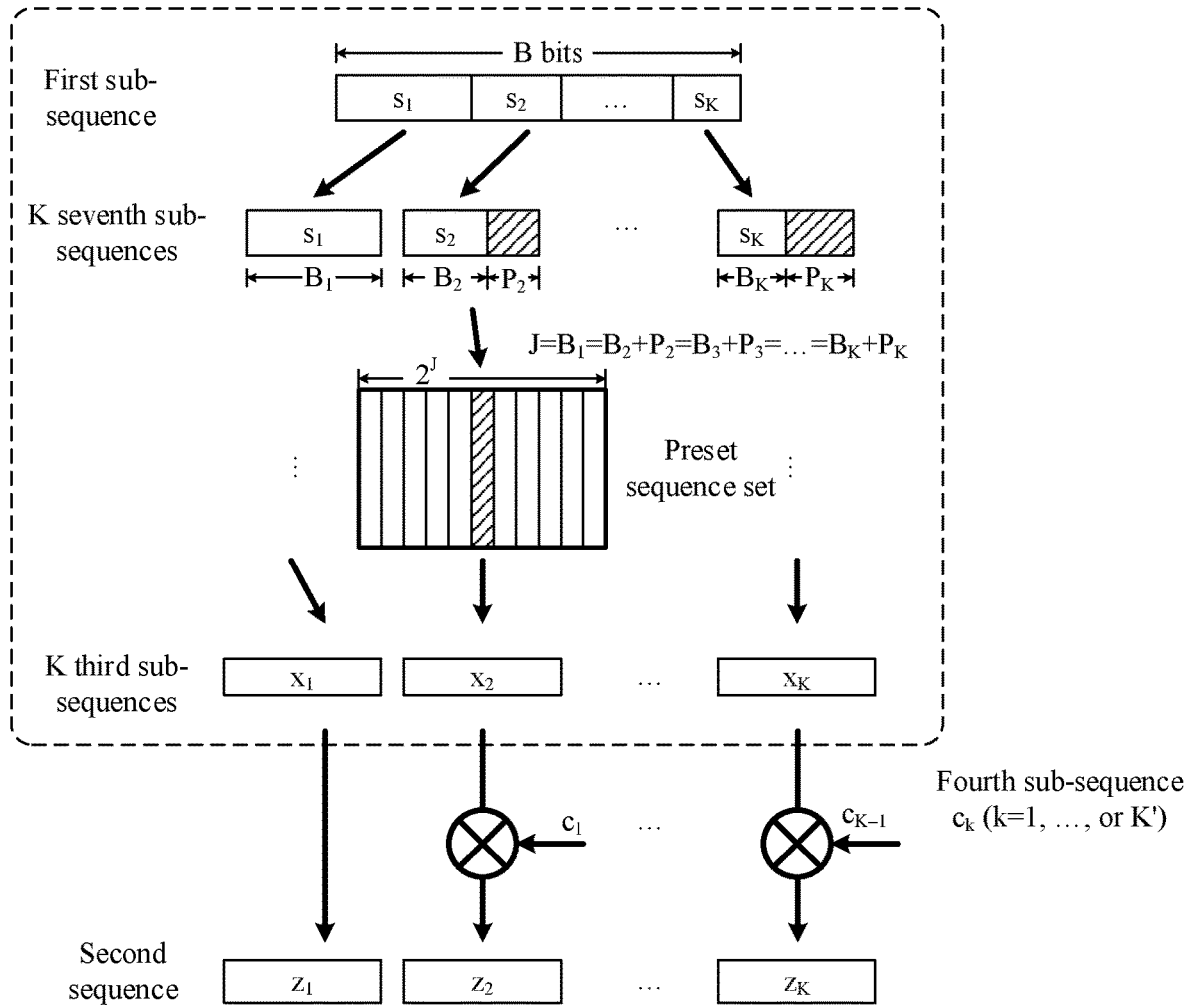
FIG. 5 is a schematic diagram of a first sub-sequence mapping method according to an embodiment of this application.

For example, as shown in FIG. 5, a first sub-sequence is divided into K eighth sub-sequences. A value of the eighth sub-sequence is $S_k$ (k=1, . . . , or K), and a length of the eighth sub-sequence is $B_k$ (k=1, . . . , or K). Check bits of each eighth sub-sequence are calculated, and check bits are placed after the eighth sub-sequences to obtain K seventh sub-sequences. A length of the check bits is $P_k$ (k=1, . . . , or K). In FIG. 5, $P_1=0$, and $J=B_1+P_1=B_2+P_2=\ldots=B_K+P_K$. In other words, each seventh sub-sequence has an equal length of information bits and check bits, and the length is J. In addition, each seventh sub-sequence corresponds to one preset sequence group, there are $2^J$ sequences in the sequence group, and the sequences in the sequence group correspond to different index values, namely, sequence numbers. A value range of the index value is 0 to $2^J-1$. A corresponding sequence is selected from the preset sequence group based on a value of each seventh sub-sequence, to be specific, a value of added check bits and information bits, to obtain each third sub-sequence.

Possibly, preset sequence groups corresponding to the seventh sub-sequences may be a same sequence group, or may be different sequence groups.

It should be noted that a check bit obtaining manner is agreed on in advance by the receive end and the transmit end. A check bit calculation manner is not limited in this application. For example, the $k^{th}$ check bit may be generated through encoding based on one or more preceding eighth sub-sequences.

Figure 6:
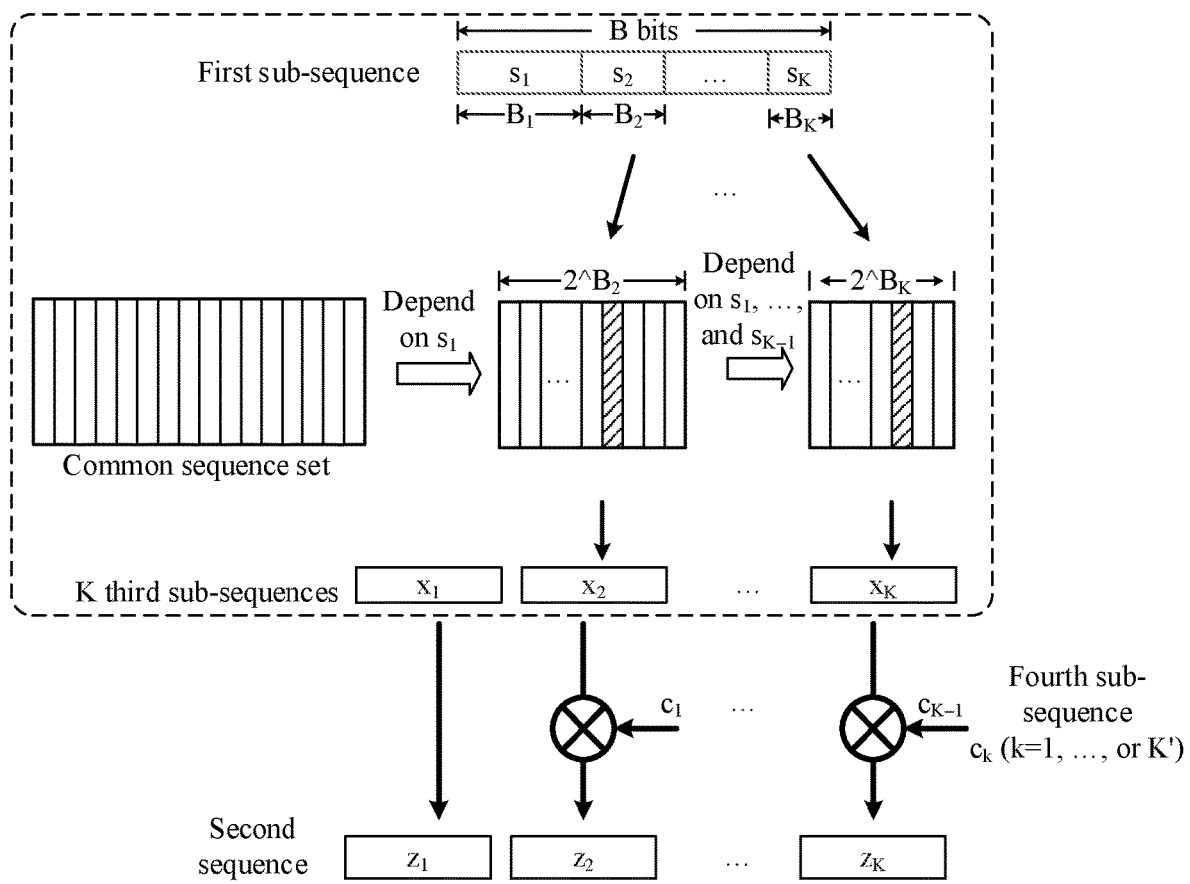
FIG. 6 is a schematic diagram of another first subsequence mapping method according to an embodiment of this application.

In another possible implementation, as shown in FIG. 6, K seventh sub-sequences are obtained based on a first sub-sequence whose length is B. A value of the seventh sub-sequence is $S_k$ (k=1, . . . , or K), a length of the seventh sub-sequence is $B_k$ (k=1, . . . , or K), and $B=\Sigma_{k=1}^{K} B_k$. A value of the $n^{th}$ first sub-sequence refers to a decimal number corresponding to a bit sequence whose length is $B_n$. A common sequence group is preset by the receive end and the transmit end, there are $2^{B_1}$ sequences in the common sequence group, and the sequences in the sequence group correspond to different index values, namely, sequence numbers. A value range of the index value is 0 to $2^{B_1}-1$. A corresponding sequence is selected from the common sequence group based on a value $S_1$ of the first seventh sub-sequence, to obtain the first third sub-sequence. The $n^{th}$ seventh sub-sequence corresponds to the $n^{th}$ sequence subgroup, and the sequence subgroup includes $2^{B_n}$ sequences in the common sequence group. Specifically, the $n^{th}$ sequence subgroup depends on values $S_1, \ldots,$ and $S_{n-1}$ of the first to the $(n-1)^{th}$ seventh sub-sequences. A corresponding sequence is selected from the $n^{th}$ sequence subgroup based on a value $S_n$ of the $n^{th}$ seventh sub-sequence, to obtain the $n^{th}$ third sub-sequence. For example, in FIG. 6, the second sequence subgroup depends on $S_1$, and the $K^{th}$ sequence subgroup depends on $S_1, \ldots,$ and $S_{K-1}$.

In the implementation shown in FIG. 6, instead of calculating a check bit, a sequence subgroup corresponding to a sub-sequence is determined based on a value of a previous sub-sequence, so that reliability of data transmission is ensured in a manner of lower calculation complexity.

S203: Perform differential coding and modulation on the second sub-sequence to obtain a fourth sub-sequence whose length is K'.

In a possible implementation, differential coding is performed before modulation. Specifically, differential coding is performed on the second sub-sequence to obtain a sixth sub-sequence whose length is m*K'; and the sixth sub-sequence whose length is m*K' is modulated to obtain the fourth sub-sequence whose length is K'.

Figure 3:
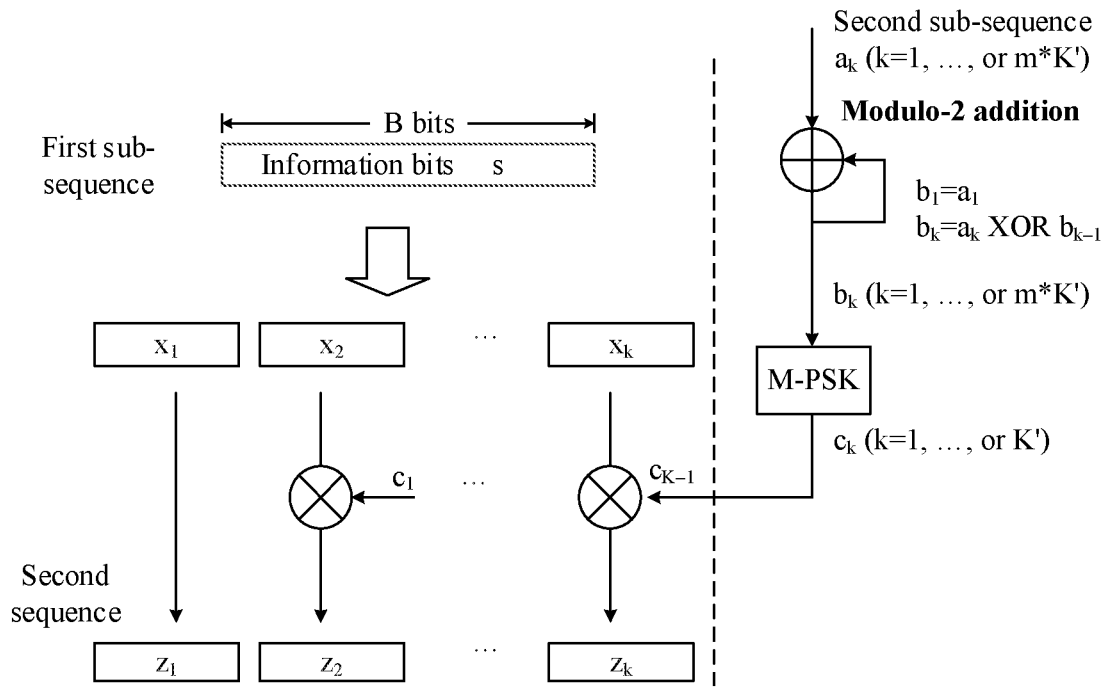
FIG. 3 is a schematic diagram of a data processing method according to an embodiment of this application.

For example, as shown in FIG. 3, refer to the right half of FIG. 3, differential coding is performed on the second sub-sequence $a_k$ (k=1, . . . , or m*K') to obtain the sixth sub-sequence $b_k$ (k=1, . . . , or m*K') whose length is m*K'. For example, differential coding may be performed in a form of modulo-2 addition. Specifically, b1=a1; and bk=ak XOR bk−1, where k=2, . . . , or m*K', m*K' is greater than or equal to 2, and XOR indicates a binary exclusive OR operation.

The sixth sub-sequence bk (k=1, . . . , or m*K') is modulated to obtain the fourth sub-sequence $c_k$ (k=1, . . . , or K') whose length is K'. Specifically, M-ary phase shift keying (M-ary phase shift keying, MPSK) modulation may be performed on the sixth sub-sequence to obtain the fourth sub-sequence, where m=$\log_2 M$, and M is an integer power of 2.

In another possible implementation, modulation is performed before differential coding. Specifically, the second sub-sequence is modulated to obtain a sixth sub-sequence whose length is K'; and differential coding is performed on the sixth sub-sequence to obtain the fourth sub-sequence whose length is K'.

Figure 4:
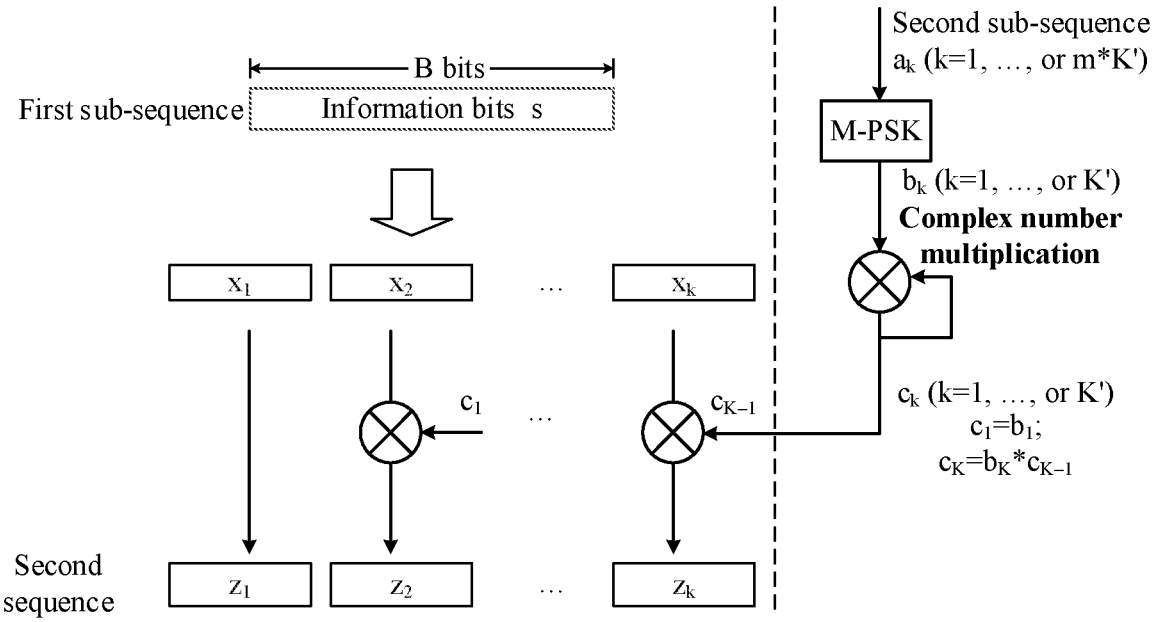
FIG. 4 is a schematic diagram of another data processing method according to an embodiment of this application.

For example, as shown in FIG. 4, refer to the right half of FIG. 4, the second sub-sequence $a_k$ (k=1, . . . , or m*K') is modulated to obtain the sixth sub-sequence $b_k$ (k=1, . . . , or K'). Specifically, MPSK modulation may be performed on the second sub-sequence to obtain the fourth sub-sequence, where m=$\log_2 M$, M is a modulation order of the MPSK modulation, and a value of M is an integer power of 2.

Differential coding is performed on the sixth sub-sequence $b_k$ (k=1, . . . , or K') to obtain the fourth sub-sequence $c_k$ (k=1, . . . , or K') whose length is K'. Specifically, $c_1=b_1$; and $c_k=b_k*c_{k-1}$, where k=2, . . . , or K', and K' is an integer greater than or equal to 2.

In the foregoing two possible implementations, M-PSK may have different implementations. For example, the sixth sub-sequence or the second sub-sequence is divided into K' groups by using m bits as one group. Each group of bits has $2^m=M$ different values, and each value corresponds to one element in a group that includes M elements. Each element in this group is a complex number, and may be defined as exp(j*2*π*k/M+θ), where k=0, 1, . . . , or M−1, exp represents an exponential operation, j is an imaginary unit, π is a ratio of circumference to diameter, θ is an initial value of a phase, and θ may be any value.

The sixth sub-sequence may be mapped, through M-PSK, into K' complex numbers, namely, the fourth sub-sequence $c_k$ (k=1, . . . , or K') whose length is K', or the second sub-sequence may be mapped, through M-PSK, into K' complex numbers, namely, the sixth sub-sequence $b_k$ (k=1, . . . , or K') whose length is K'.

The modulation order M may be 2, in other words, binary phase shift keying (BPSK) modulation is performed on the sixth sub-sequence or the second sub-sequence. In this case, m=1, and K' bits can be additionally transmitted. M may be 4, in other words, quadrature phase shift keying (QPSK) modulation is performed on the sixth sub-sequence or the second sub-sequence. In this case, m=2, and 2K' bits can be additionally transmitted. M may be 8, in other words, 8 phase shift keying 8PSK modulation is performed on the sixth sub-sequence or the second sub-sequence. In this case, m=3, and 3K' bits can be additionally transmitted.

It should be noted that a higher modulation order indicates a larger quantity of bits that can be transmitted. Selection of the modulation order is related to a value of an amount of transmitted data. If an amount of data that needs to be transmitted is relatively small, lower-order modulation such as BPSK may be used to ensure accuracy of data transmission; or if an amount of data that needs to be transmitted is relatively large, higher-order modulation may be used, so that more data can be transmitted when a same resource is occupied.

In addition, a sequence of performing step S202 and step S203 is not limited in this application. For example, S202 may be performed before S203, S203 may be performed before S202, or S202 and S203 may be simultaneously performed.

S204: Obtain K fifth sub-sequences based on the K third sub-sequences and the fourth sub-sequence whose length is K'.

The fourth sub-sequence whose length is K' and that is obtained in S203 is a complex sequence. The K third sub-sequences and elements in the fourth sub-sequence are multiplied, so that a phase of the fourth sub-sequence can be flipped or shifted.

The obtaining K fifth sub-sequences $z_k$ (k=1, . . . , or K) based on the K third sub-sequences $x_k$ and the fourth sub-sequence $c_k$ whose length is K' is specifically:

$z_1=x_1$, where k=1, . . . , or K−K'; and $z_k=c_{k-1}*x_k$, where k=K−K'+1, . . . , or K.

The length K' of the fourth sub-sequence is less than a quantity K of third sub-sequences.

For example, refer to FIG. 3 or FIG. 4. The K fifth sub-sequences are sequentially $z_1=x_1, z_2=c_1*x_2, \ldots,$ and $z_K=c_{K'}*x_K$, where K'=K−1. In the scenarios shown in FIG. 3 and FIG. 4, most bits, to be specific, (K−1) bits, can be additionally transmitted.

K' may be alternatively another value less than K. For example, when K'=1, the K fifth sub-sequences are sequentially $z_1=x_1, z_2=x_2, \ldots,$ and $z_K=c_1-x_K$, and 1 bit can be additionally transmitted.

S205: Output a second sequence, where the second sequence includes the K fifth sub-sequences.

The second sequence including the K fifth sub-sequences is output. For example, the transmit end sends the second sequence to the receive end, and correspondingly, the receive end may receive the second sequence.

Compared with a conventional communication manner, in the technical solution provided in this application, no pilot needs to be transmitted, and the receive end may perform reception through compressive sensing. On this basis, in the foregoing embodiment, sent information bits are divided into two parts, a first part is mapped into a plurality of short sequences (the K third sub-sequences), differential coding and modulation are performed on a second part to obtain a complex sequence (the fourth sequence whose length is K'), and an element in the sequence and a corresponding short sequence are multiplied, so that a phase of the short sequence is flipped or shifted, thereby additionally transmitting information bits.

Figure 7:
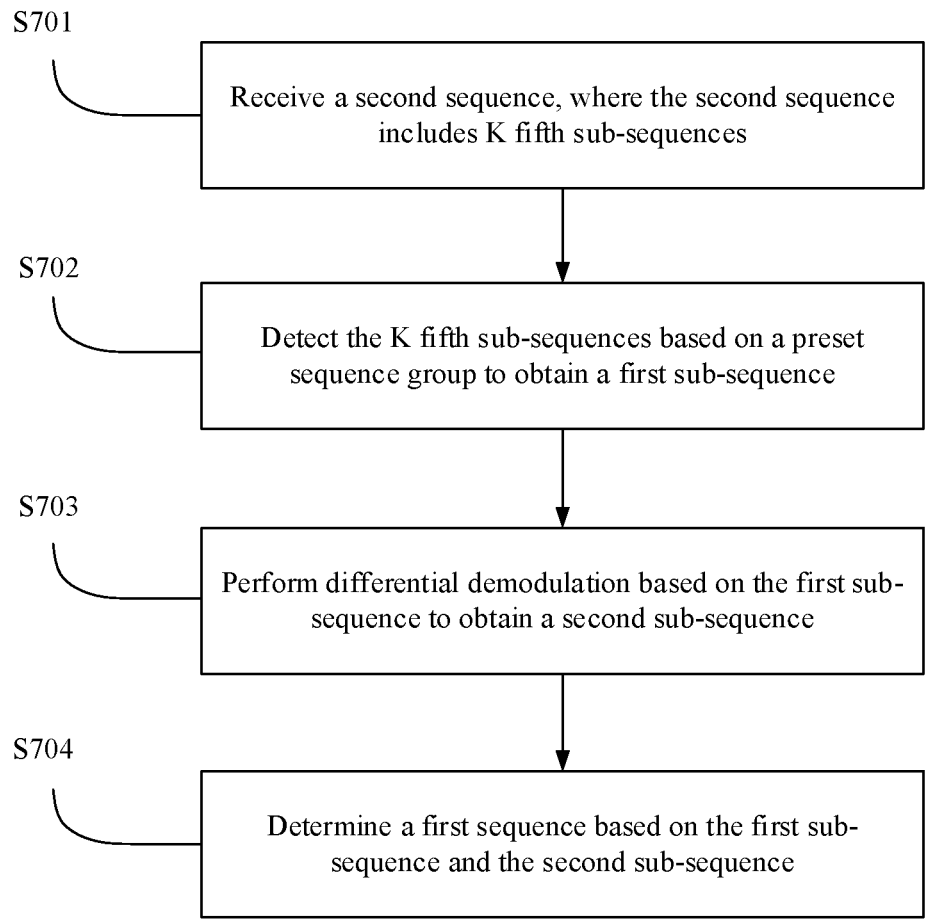
FIG. 7 is a schematic flowchart of a data transmission method at a receive end according to an embodiment of this application.

FIG. 7 is a schematic flowchart of data transmission at a receive end according to an embodiment of this application. It should be noted that the receive end refers to a side on which data is received, and the method may be performed by a terminal device or a network device. For example, when a transmit end is a terminal device, the receive end may be a terminal device or a network device; or when a transmit end is a network device, the receive end may be a terminal device or a network device. This is not limited in this application.

S701: Receive a second sequence, where the second sequence includes K fifth sub-sequences.

The receive end receives the second sequence sent by the transmit end. The second sequence includes the K fifth sub-sequences.

S702: Detect the K fifth sub-sequences based on a preset sequence group to obtain a first sub-sequence.

The first sub-sequence includes K seventh sub-sequences.

The detecting the K fifth sub-sequences based on a preset sequence group is specifically: detecting the fifth sub-sequence based on the preset sequence group, and determining a sequence number or an index number of a sequence that is in the preset sequence group and that corresponds to the fifth sub-sequence, where the sequence number or the index number is a value of the seventh sub-sequence; and determining the seventh sub-sequence based on the value of the seventh sub-sequence.

Possibly, the foregoing detection is correlation detection. The determined sequence number or index number of the sequence that is in the preset sequence group and that corresponds to the fifth sub-sequence is specifically a sequence number or an index number of a sequence that is in the preset sequence group that has a highest correlation with the fifth sub-sequence.

A length of each of the K seventh sub-sequences is agreed on by the receive end and the transmit end. The determining the seventh sub-sequence based on the value of the seventh sub-sequence is specifically: determining a value of each bit of the seventh sub-sequence based on the length and the value of the seventh sub-sequence.

Possibly, the first sub-sequence includes K eighth sub-sequences, and the K seventh sub-sequences are obtained by adding check bits to some or all of the K eighth sub-sequences, in other words, some or all of the K seventh sub-sequences include check bits. In this implementation, after the seventh sub-sequence is determined through detection based on the preset sequence group, verification is performed based on a check manner agreed on by the receive end and the transmit end, and the K eighth sub-sequences are restored after the verification succeeds, so that the first sub-sequence sent by the transmit end is obtained.

In a possible implementation, K preset groups corresponding to all of the K seventh sub-sequences are agreed on by the receive end and the transmit end. For example, refer to the mapping method shown in FIG. 5. In this implementation, the $n^{th}$ fifth sub-sequence is detected based on the $n^{th}$ preset sequence group to determine the $n^{th}$ seventh sub-sequence, where n is an integer greater than or equal to 1 and less than or equal to K.

In another possible implementation, a common sequence group is agreed on by the receive end and the transmit end. For example, refer to the mapping method shown in FIG. 6. In this implementation, the K fifth sub-sequences are detected based on the common sequence group to determine the K seventh sub-sequences. Specifically, the first fifth sub-sequence is detected based on the common sequence group to determine a value of the first seventh sub-sequence.

The second sequence subgroup corresponding to the second fifth sub-sequence is determined based on the value of the first seventh sub-sequence and the common sequence group, and the second fifth sub-sequence is detected based on the second sequence subgroup to determine a value of the second seventh sub-sequence.

By analogy, the $n^{th}$ sequence subgroup corresponding to the $n^{th}$ fifth sub-sequence is determined based on values of the first to the $(n-1)^{th}$ fifth sub-sequences and the common sequence group, where n∈[2, K]. The $n^{th}$ fifth sub-sequence is detected based on the $n^{th}$ sequence subgroup to determine a value of the $n^{th}$ seventh sub-sequence.

S703: Perform differential demodulation based on the first sub-sequence to obtain a second sub-sequence.

Differential demodulation is performed based on a phase difference between the first sub-sequence of the transmit end and the second sequence received by the receive end, to obtain the second sub-sequence. In other words, differential demodulation is performed based on a phase difference between the restored seventh sub-sequence and the received fifth sub-sequence to obtain the second sub-sequence.

Specifically, a phase difference $H_k$ between the $k^{th}$ fifth sub-sequence and the $k^{th}$ seventh sub-sequence is determined; and a phase difference $H_{k-1}$ between the $(k-1)^{th}$ fifth sub-sequence and the $(k-1)^{th}$ seventh sub-sequence is determined.

Differential demodulation is performed on $H_k$ and $H_{k-1}$ to obtain $a_{k-(K-K')}$ in the second sub-sequence, where k=K-K'+1, . . . , or K, K is a quantity of seventh sub-sequences or a format of the fifth sub-sequence, a value of K is an integer greater than or equal to 2, K' is a length of the second sub-sequence, and a value of K' is a positive integer less than K.

For example, in the scenario shown in FIG. 3 or FIG. 4, K'=K-1, and differential demodulation is performed on $H_K$ and $H_{K-1}$ to obtain $a_{k-1}$ in the second sub-sequence, where k=2, . . . , or K. For example, differential demodulation is performed on $H_2$ and $H_1$ to obtain $a_1$, and differential demodulation is performed on $H_K$ and $H_{K-1}$ to obtain $a_{K-1}$, namely, $a_{K'}$.

K' may be alternatively another value less than K. For example, when K'=1, differential demodulation is performed on $H_K$ and $H_{K-1}$ to obtain $a_1$.

S704: Determine a first sequence based on the first sub-sequence and the second sub-sequence.

The first sub-sequence is determined in S702, and differential demodulation is performed based on the first sub-sequence to obtain the second sub-sequence in S703, to determine the first sequence, namely, data bits sent by the transmit end.

In a possible implementation, the first sub-sequence and the second sub-sequence may have overlapping parts. For example, the second sub-sequence is a part of the first sub-sequence, or the second sub-sequence and the first sub-sequence are a same sequence, or the second subsequence includes a part of the first sub-sequence and another information bit. In other words, the transmit end repeatedly transmits some or all bits of the first sub-sequence. After restoring the first sub-sequence and the second sub-sequence, the receive end compares the overlapping pails of the first sub-sequence and the second sub-sequence to determine whether the overlapping parts are the same. If the overlapping parts are the same, it indicates that the transmission is correct; or if the overlapping pails are different, it indicates that an error occurs in the transmission. In this implementation, reliability of data transmission can be improved.

In the transmission method shown in FIG. 7, after receiving the second sequence, the receive end can obtain the first sub-sequence through detection, and then obtain the second sub-sequence through differential demodulation, so that when the second sub-sequence is additionally transmitted in addition to the first sub-sequence, data actually to be transmitted by the transmit end is restored.

To implement functions in the foregoing methods provided in embodiments of this application, a receive end device and a transmit end device each may include a hardware structure and/or a software module, and implement the foregoing functions in a form of a hardware structure, a software module, or a hardware structure and a software module. The receive end device may be a terminal device or a network device. Similarly, the transmit end device may be a terminal device or a network device. Whether one of the foregoing functions is performed in the manner of a hardware structure, a software module, or a hardware structure and a software module depends on a specific application and design constraints of the technical solutions.

Figure 8:
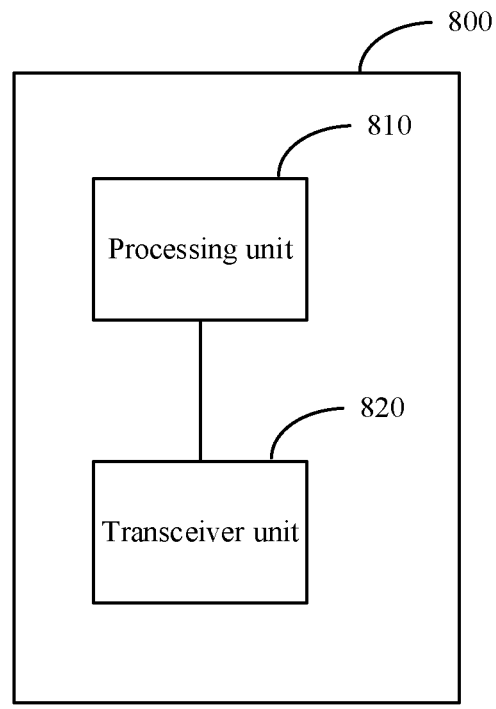
FIG. 8 is a schematic diagram of a structure of a communication apparatus according to an embodiment of this application.

As shown in FIG. 8, based on a same technical concept, an embodiment of this application further provides a communication apparatus 800. The communication apparatus 800 may be a terminal or a network device, may be an apparatus in the terminal device or the network device, or may be an apparatus that can be used together with the terminal device or the network device. In a possible implementation, the communication apparatus 800 may include modules or units correspondingly performing the methods/operations/steps/actions of the transmit end or the receive end in the foregoing method embodiments. The unit may be a hardware circuit, may be software, or may be implemented in a combination of a hardware circuit and software. In a possible implementation, the communication apparatus 800 may include a processing unit 810 and a transceiver unit 820. The processing unit 810 may be configured to invoke the transceiver unit 820 to perform receiving and/or sending functions.

When the communication apparatus 800 is configured to perform a method (for example, the method shown in FIG. 2) at the transmit end, the processing unit 810 is configured to obtain a first sequence. The first sequence includes a first sub-sequence whose length is B and a second sub-sequence whose length is m*K'. The processing unit 810 is configured to: obtain the first sequence, and determine the first sub-sequence and the second sub-sequence based on the first sequence, where a length of the second sub-sequence is m*K'; map the first sub-sequence into K third sub-sequences based on a preset sequence group, where K is an integer greater than or equal to 2, and K' is a positive integer less than K; perform differential coding and modulation on the second sub-sequence to obtain a fourth sub-sequence whose length is K'; and obtain K fifth sub-sequences based on the K third sub-sequences and the fourth sub-sequence whose length is K'. The transceiver unit 820 is configured to output a second sequence. The second sequence includes the K fifth sub-sequences.

When the communication apparatus 800 is configured to perform a method (for example, the method shown in FIG. 7) at the receive end, the transceiver unit 820 is configured to obtain a second sequence. The second sequence includes K fifth sub-sequences. The processing unit 810 is configured to: detect the K fifth sub-sequences based on a preset sequence group to obtain a first sub-sequence; perform differential demodulation based on the first sub-sequence to obtain a second sub-sequence; and determine a first sequence based on the first sub-sequence and the second sub-sequence.

The transceiver unit 820 is further configured to perform another receiving or sending step or operation in the method at the transmit end or the receive end in the foregoing method embodiments. The processing unit 810 may be further configured to perform a corresponding step or operation other than a receiving/sending step in the method at the transmit end or the receive end in the foregoing method embodiments. Details are not described herein again.

Division into the modules in embodiments of this application is an example, is merely logical function division, and may be other division during actual implementation. In addition, functional modules in embodiments of this application may be integrated into one processor, or each of the modules may exist alone physically, or two or more modules may be integrated into one module. The integrated module or unit may be implemented in a form of hardware, or may be implemented in a form of a software functional module.

Figure 9:
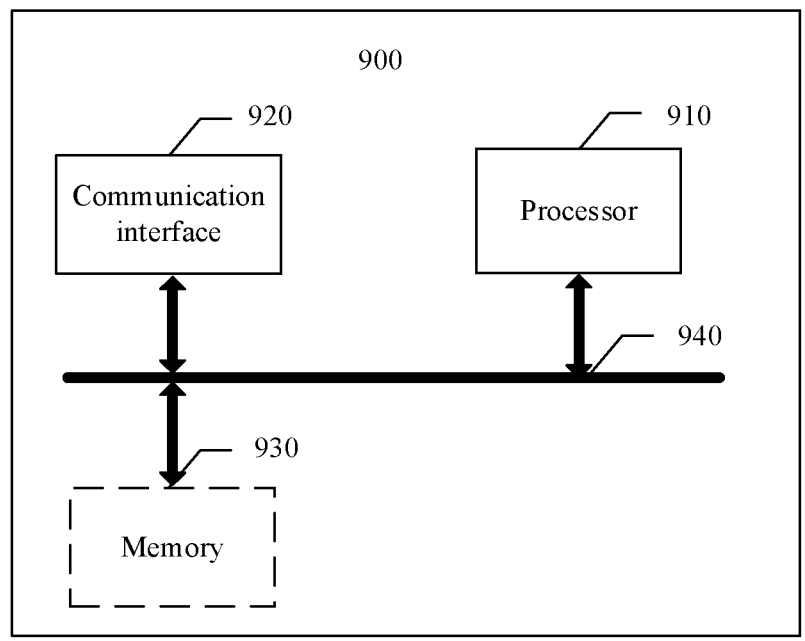
FIG. 9 is a schematic diagram of a structure of another communication apparatus according to an embodiment of this application.

Refer to FIG. 9. An embodiment of this application further provides a communication apparatus 900, configured to implement functions of a transmit end device or a receive end device in the foregoing method. The communication apparatus may be a terminal or a network device, may be an apparatus in the terminal or the network device, or may be an apparatus that can be used together with the terminal or the network device. The communication apparatus 900 may be a chip system. In this embodiment of this application, the chip system may include a chip, or may include a chip and another discrete component. The communication apparatus 900 includes at least one processor 910, configured to implement functions of a terminal and a network device in the method provided in embodiments of this application. The communication apparatus 900 may further include a communication interface 920. In this embodiment of this application, the communication interface may be a transceiver, a circuit, a bus, a module, or another type of communication interface, and is configured to communicate with another device by using a transmission medium. For example, the communication interface 920 is used by an apparatus in the communication apparatus 900 to communicate with another device.

The processor 910 may perform functions performed by the processing unit 910 in the communication apparatus 900, and the communication interface 920 may be configured to perform functions performed by the transceiver unit 920 in the communication apparatus 900.

When the communication apparatus 900 is configured to perform a method (for example, the method shown in FIG. 2) at a transmit end, the processor 910 is configured to: obtain a first sequence, and determine a first sub-sequence and a second sub-sequence based on the first sequence, where a length of the second sub-sequence is m*K'; map the first sub-sequence into K third sub-sequences based on a preset sequence group, where K is an integer greater than or equal to 2, and K' is a positive integer less than K; perform differential coding and modulation on the second sub-sequence to obtain a fourth sub-sequence whose length is K'; and obtain K fifth sub-sequences based on the K third sub-sequences and the fourth sub-sequence whose length is K'. The communication interface 920 is configured to output a second sequence. The second sequence includes the K fifth sub-sequences.

When the communication apparatus 900 is configured to perform a method (for example, the method shown in FIG. 7) at a receive end, the communication interface 920 is configured to obtain a second sequence. The second sequence includes K fifth sub-sequences. The processor 910 is configured to: detect the K fifth sub-sequences based on a preset sequence group to obtain a first sub-sequence; perform differential demodulation based on the first sub-sequence to obtain a second sub-sequence; and determine a first sequence based on the first sub-sequence and the second sub-sequence.

The communication interface 920 is further configured to perform another receiving or sending step or operation involved in the method at the transmit end or the receive end in the foregoing method embodiments. The processor 910 may be further configured to perform a corresponding step or operation other than a receiving/sending step in the foregoing method embodiments. Details are not described herein again.

The communication apparatus 900 may further include at least one memory 930, configured to store program instructions and/or data. The memory 930 is coupled to the processor 910. The coupling in this embodiment of this application is indirect coupling or a communication connection between apparatuses, units, or modules for information exchange between the apparatuses, the units, or the modules, and may be in electrical, mechanical, or other forms. The processor 920 may perform an operation in cooperation with the memory 930. The processor 910 may execute the program instructions stored in the memory 930. In a possible implementation, at least one of the at least one memory may be integrated with the processor. In another possible implementation, the memory 930 is located outside the communication apparatus 900.

A specific connection medium between the communication interface 920, the processor 910, and the memory 930 is not limited in this embodiment of this application. In this embodiment of this application, the memory 930, the processor 910, and the communication interface 920 are connected to each other by using a bus 940 in FIG. 9. The bus is represented by a bold line in FIG. 9. A connection manner between other components is merely an example for description, and imposes no limitation. The bus may be classified into an address bus, a data bus, a control bus, and the like. For ease of representation, only one thick line is used to represent the bus in FIG. 9, but this does not mean that there is only one bus or only one type of bus.

In this embodiment of this application, the processor 910 may be a baseband processor. For example, at the transmit end, the processor 910 determines K fifth sub-sequences by using any possible implementation in the foregoing method embodiments, outputs a second sequence (a baseband signal) including the K fifth sub-sequences to a radio frequency circuit by using the communication interface 920. The radio frequency circuit performs radio frequency processing on the baseband signal, and sends a radio frequency signal to the outside in a form of an electromagnetic wave by using an antenna. For example, at the receive end, a radio frequency circuit receives a radio frequency signal by using an antenna, and converts the radio frequency signal into a baseband signal (a second sequence). The communication interface 920 obtains the second sequence. The second sequence includes K fifth sub-sequences. The processor 910 restores a first sequence based on the K fifth sub-sequences by using any possible implementation in the foregoing method embodiments.

It should be noted that the processor 910 may be one or more central processing units (CPU). When the processor 910 is one CPU, the CPU may be a single-core CPU, or may be a multi-core CPU. The processor 910 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to embodiments of this application may be directly performed and completed by a hardware processor, or may be performed and completed by a combination of hardware and software modules in the processor.

In this embodiment of this application, the memory 930 may include but is not limited to a non-volatile memory such as a hard disk drive (HDD) or a solid-state drive (SSD), a random access memory (RAM), an erasable programmable read-only memory (EPROM), a read-only memory (ROM), a compact disc read-only memory (CD-ROM), or the like. The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Figure 10:
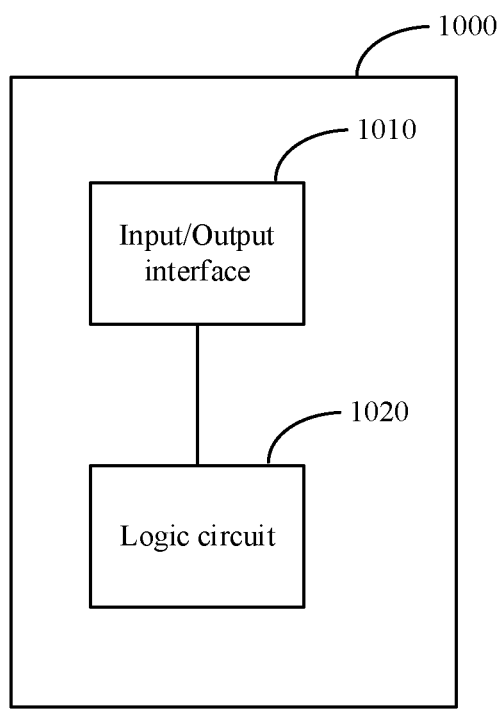
FIG. 10 is a schematic diagram of a structure of still another communication apparatus according to an embodiment of this application.

Refer to FIG. 10. An embodiment of this application further provides an apparatus 1000. The apparatus 1000 may be configured to implement functions of a transmit end device or a receive end device in the foregoing method. The apparatus 1000 may be a communication apparatus or a chip in the communication apparatus. The communication apparatus includes:

at least one input/output interface 1010 and a logic circuit 1020. The input/output interface 1010 may be an input/output circuit. The logic circuit 1020 may be a signal processor, a chip, or another integrated circuit that can implement the method in this application.

The at least one input/output interface 1010 is configured to input or output a signal or data. For example, when the apparatus is a transmit end device or is used in a transmit end device, the input/output interface 1010 is configured to obtain a first sequence. The input/output interface 1010 is further configured to output a second sequence. The second sequence includes K fifth sub-sequences. For example, when the apparatus is a receive end device or is used in a receive end device, the input/output interface 1010 is configured to obtain a second sequence. The second sequence includes K fifth sub-sequences.

The logic circuit 1020 is configured to perform some or all steps of any method provided in embodiments of this application. The logic circuit may implement functions implemented by the processing unit 810 in the foregoing apparatus 800 and the processor 910 in the apparatus 900. For example, when the apparatus is a transmit end device or is used in a transmit end device, the apparatus is configured to perform various steps in the foregoing embodiment of the method at the transmit end. For example, the logic circuit 1020 is configured to: map a first sub-sequence into K third sub-sequences based on a preset sequence group, where K is an integer greater than or equal to 2, and K' is a positive integer less than K; perform differential coding and modulation on a second sub-sequence to obtain a fourth sub-sequence whose length is K'; and obtain K fifth sub-sequences based on the K third sub-sequences and the fourth sub-sequence whose length is K'. When the apparatus is a receive end device or is used in a receive end device, the apparatus is configured to perform steps performed by a transmit end device in various possible implementations in the foregoing embodiment of the method at the receive end. For example, the logic circuit 1020 is configured to: detect K fifth sub-sequences based on a preset sequence group to obtain a first sub-sequence; perform differential demodulation based on the first sub-sequence to obtain a second sub-sequence; and determine a first sequence based on the first sub-sequence and the second sub-sequence.

Based on a same concept as the foregoing method embodiments, an embodiment of this application further provides a computer-readable storage medium. The computer-readable storage medium stores a computer program, and the computer program is executed by hardware (for example, a processor) to implement some or all steps of any method performed by any apparatus in embodiments of this application.

Based on a same concept as the foregoing method embodiments, an embodiment of this application further provides a computer program product including instructions. When the computer program product runs on a computer, the computer is enabled to perform some or all steps of any method in the foregoing aspects.

Based on a same concept as the foregoing method embodiments, this application further provides a chip or a chip system. The chip may include a processor. The chip may further include a memory (or a storage module) and/or a transceiver (or a communication module); or the chip is coupled to a memory (or a storage module) and/or a transceiver (or a communication module). The transceiver (or the communication module) may be configured to support the chip in performing wired and/or wireless communication. The memory (or the storage module) may be configured to store a program. The processor invokes the program to implement operations performed by a transmit end device or a receive end device in the foregoing method embodiments and any possible implementation of the foregoing method embodiments. The chip system may include the foregoing chip, or may include the foregoing chip and another discrete component such as a memory (or a storage module) and/or a transceiver (or a communication module).

Based on a same concept as the foregoing method embodiments, this application further provides a communication system. The communication system may include the foregoing transmit end device and the foregoing receive end device. The transmit end device may be a terminal or a network device, and the receive end device may be a terminal or a network device. The communication system may be configured to implement operations performed by the transmit end device or the receive end device in the foregoing method embodiments and any possible implementation of the foregoing method embodiments. For example, the communication system may have the structure shown in FIG. 1.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, descriptions of embodiments have respective focuses. For a part that is not described in detail in an embodiment, refer to related description in other embodiments.

In the foregoing embodiments, descriptions of embodiments have respective focuses. For a part that is not described in detail in an embodiment, refer to related description in other embodiments.

In the several embodiments provided in this application, it should be understood that the disclosed apparatus may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, in other words, may be located in one position, or may be distributed on a plurality of network units. Some or all of the units may be selected based on actual needs to achieve the objectives of the solutions of embodiments.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application.

The foregoing descriptions are merely some specific implementations of this application, but are not intended to limit the protection scope of this application. Any person skilled in the art may make other changes and modifications to these embodiments within the technical scope disclosed in this application. Therefore, the appended claims are intended to be construed as including the foregoing embodiments and the changes and modifications falling within the scope of this application. Therefore, the protection scope of this application shall be subject to the protection scope of the claims.

What is claimed is:

1. A method, comprising:
   obtaining, by an apparatus, a first sequence;
   determining, by the apparatus, a first sub-sequence and a second sub-sequence based on the first sequence, wherein a length of the second sub-sequence is m*K';
   mapping, by the apparatus, the first sub-sequence into K third sub-sequences based on a preset sequence group, wherein K is an integer greater than 2, and K' is a positive integer less than K;
   performing, by the apparatus, differential coding and modulation on the second sub-sequence to obtain a fourth sub-sequence, wherein a length of the fourth sub-sequence is K', and wherein a modulation order used for the modulation is $2^m$;
   obtaining, by the apparatus, K fifth sub-sequences based on the K third sub-sequences and the fourth sub-sequence; and
   outputting, by the apparatus, a second sequence, wherein the second sequence comprises the K fifth sub-sequences.

2. The method according to claim 1,
   wherein the second sub-sequence is a part of the first sub-sequence, or
   wherein the second sub-sequence is the same as the first sub-sequence.

3. The method according to claim 1, wherein the performing the differential coding and the modulation on the second sub-sequence to obtain the fourth sub-sequence comprises:
   modulating the second sub-sequence to obtain a sixth sub-sequence, a length of the sixth sub-sequence is K'; and
   performing the differential coding on the sixth sub-sequence to obtain the fourth sub-sequence.

4. The method according to claim 3, the performing the differential coding comprising:
   performing the differential coding on the sixth sub-sequence $b_1, b_2, \ldots, b_{K'}$ to obtain the fourth sub-sequence $c_1, c_2, \ldots, c_{K'}$,
   wherein $c_1 = b_1$, and
   wherein, when K' is greater than or equal to 2, $c_k = b_k * c_{k-1}, \ldots,$ or K'.

5. The method according to claim 1, wherein the performing the differential coding and the modulation on the second sub-sequence to obtain the fourth sub-sequence comprises:
   performing the differential coding on the second sub-sequence to obtain a sixth sub-sequence, wherein a length of the sixth sub-sequence is m*K'; and
   modulating the sixth sub-sequence to obtain the fourth sub-sequence.

6. The method according to claim 5, wherein the performing the differential coding comprising:
   performing the differential coding on the second sub-sequence $a_1, a_2, \ldots, a_{K'}$ to obtain the sixth sub-sequence $b_1, b_2, \ldots, b_{m*K'}$,
   wherein the length of the sixth sub-sequence is m*K', wherein $b_1 = a_1$, and
   wherein, when m*K' is greater than or equal to 2, $b_k = a_k$ XOR $b_{k-1}$, wherein $k = 2, \ldots,$ or m*K', and XOR indicates a binary exclusive OR operation.

7. The method according to claim 1, wherein the performing the modulation comprises:
   performing the modulation through M-ary phase shift keying M-PSK.

8. The method according to claim 7,
   wherein the M-ary phase shift keying M-PSK is binary phase shift keying BPSK, and m=1, or
   wherein the M-ary phase shift keying M-PSK is quadrature phase shift keying QPSK, and M=2, or
   wherein the M-ary phase shift keying M-PSK is 8 phase shift keying 8PSK, and m=3.

9. The method according to claim 1, the obtaining the K fifth sub-sequences comprising:
   obtaining the K fifth sub-sequences $z_k$ based on the K third sub-sequences $x_1$ and the fourth sub-sequence $c_k$,
   wherein $z_1 = x_1$, wherein $k = 1, \ldots,$ or K–K', and
   wherein $z_k = c_{k-1} * x_k$, and wherein $k = K - K' + 1, \ldots,$ or K.

10. The method according to claim 1, wherein the mapping the first sub-sequence into the K third sub-sequences based on the preset sequence group comprises:
    obtaining K seventh sub-sequences based on the first sub-sequence; and
    mapping each seventh sub-sequence of the K seventh sub-sequences into each corresponding third sub-sequence of the K third sub-sequences based on a corresponding value of the each seventh sub-sequence and the preset sequence group,
    wherein the each corresponding third sub-sequence is a sequence in the preset sequence group, and wherein a corresponding sequence number of the each corresponding third sub-sequence in the preset sequence group is equal to the corresponding value of the each seventh sub-sequence.

11. The method according to claim 10, comprising
    dividing the first sub-sequence into K eighth sub-sequences; and
    adding check bits to the K eighth sub-sequences to obtain the K seventh sub-sequences.

12. A method, comprising:
    obtaining a second sequence, wherein the second sequence comprises K fifth sub-sequences;
    detecting the K fifth sub-sequences based on a preset sequence group to obtain a first sub-sequence;
    performing differential demodulation based on the first sub-sequence to obtain a second sub-sequence; and
    determining a first sequence based on the first sub-sequence and the second sub-sequence.

13. The method according to claim 12, wherein the detecting the K fifth sub-sequences based on the preset sequence group to obtain the first sub-sequence comprises:
    detecting each fifth sub-sequence of the K fifth sub-sequences based on the preset sequence group;
    determining a corresponding sub-sequence that is in the preset sequence group and that corresponds to the each fifth sub-sequence, wherein the first sub-sequence comprises K seventh sub-sequences, and wherein a corresponding sequence number of the corresponding subsequence is a corresponding value of each corresponding seventh sub-sequence of the K seventh sub-sequences; and determining the each corresponding seventh sub-sequence based on the corresponding value of the each corresponding seventh sub-sequence.

14. The method according to claim 13, wherein the performing the differential demodulation based on the first sub-sequence comprises:

determining a phase difference between the each fifth sub-sequence and the each corresponding seventh sub-sequence; and performing the differential demodulation based on the phase difference to obtain the second sub-sequence.

15. The method according to claim 13, further comprising:

determining a $k^{th}$ phase difference $H_k$ between a $k^{th}$ fifth sub-sequence of the K fifth sub-sequences and a $k^{th}$ seventh sub-sequence of the K seventh sub-sequences;

determining a $(k-1)^{th}$ phase difference $H_{k-1}$ between a $(k-1)^{th}$ fifth sub-sequence of the K fifth sub-sequences and a $(k-1)^{th}$ seventh sub-sequence of the K seventh sub-sequences; and performing differential demodulation on $H_k$ and $H_{k-1}$ to obtain $a_{k-(K-K')}$ in the second sub-sequence, wherein k=K-K'+1, . . . , or K, K is an integer greater than or equal to 2, and K' is a positive integer less than K.

16. An apparatus, comprising:

at least one processor; and a non-transitory computer readable storage medium storing programming, the programming including instructions that, when executed by the at least one processor, cause the apparatus to perform operations including:

obtaining a first sequence;

determining a first sub-sequence and a second sub-sequence based on the first sequence, wherein a length of the second sub-sequence is m*K';

mapping the first sub-sequence into K third sub-sequences based on a preset sequence group, wherein K is an integer greater than 2, and K' is a positive integer less than K;

performing differential coding and modulation on the second sub-sequence to obtain a fourth sub-sequence, wherein a length of the fourth sub-sequence is K', and wherein a modulation order used for the modulation is $2^m$;

obtaining K fifth sub-sequences based on the K third sub-sequences and the fourth sub-sequence; and outputting a second sequence, wherein the second sequence comprises the K fifth sub-sequences.

17. The apparatus according to claim 16, wherein the second sub-sequence is a part of the first sub-sequence, or wherein the second sub-sequence is the same as the first sub-sequence.

18. The apparatus according to claim 16, wherein the performing the differential coding and the modulation on the second sub-sequence to obtain the fourth sub-sequence comprises:

modulating the second sub-sequence to obtain a sixth sub-sequence, a length of the sixth sub-sequence is K'; and performing the differential coding on the sixth sub-sequence to obtain the fourth sub-sequence.

19. The apparatus according to claim 18, the performing the differential coding comprising:

performing the differential coding on the sixth sub-sequence $b_1, b_2, \ldots, b_{K'}$ to obtain the fourth sub-sequence $c_1, c_2, \ldots, c_{K'}$ wherein $c_1=b_1$, and wherein, when K' is greater than or equal to 2, $c_k=b_k*c_{k-1}$, k=2, . . . , or K'.

20. The apparatus according to claim 16, wherein the performing the differential coding and the modulation on the second sub-sequence to obtain the fourth sub-sequence comprises:

performing the differential coding on the second sub-sequence to obtain a sixth sub-sequence, wherein a length of the sixth sub-sequence is m*K'; and modulating the sixth sub-sequence to obtain the fourth sub-sequence.

* * * * *